United States Patent
Park et al.

(10) Patent No.: US 10,091,726 B2
(45) Date of Patent: Oct. 2, 2018

(54) METHOD AND APPARATUS FOR OPERATING BASED ON POWER SAVE MODE IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 15/110,688

(22) PCT Filed: Jan. 12, 2015

(86) PCT No.: PCT/KR2015/000300
§ 371 (c)(1),
(2) Date: Jul. 8, 2016

(87) PCT Pub. No.: WO2015/105392
PCT Pub. Date: Jul. 16, 2015

(65) Prior Publication Data
US 2016/0337968 A1    Nov. 17, 2016

Related U.S. Application Data

(60) Provisional application No. 62/100,068, filed on Jan. 6, 2015, provisional application No. 61/925,649, filed on Jan. 10, 2014.

(51) Int. Cl.
*H04W 84/12*    (2009.01)
*H04W 52/02*    (2009.01)

(52) U.S. Cl.
CPC ... *H04W 52/0216* (2013.01); *H04W 52/0235* (2013.01); *H04W 52/0229* (2013.01);
(Continued)

(58) Field of Classification Search
CPC . H04L 52/02; H04L 52/0216; H04L 52/0235; H04L 52/0229; H04L 84/12;
(Continued)

(56) References Cited

U.S. PATENT DOCUMENTS

2010/0226299 A1* 9/2010 Sumida ............. H04W 52/0229
                                                    370/311
2011/0225440 A1* 9/2011 Kwon ............... H04W 52/0235
                                                    713/323

(Continued)

FOREIGN PATENT DOCUMENTS

JP    2009206762 A    9/2009
KR    1020130085428 A    7/2013
KR    1020130139761 A    12/2013

*Primary Examiner* — Mewale Ambaye
(74) *Attorney, Agent, or Firm* — Lee Hong Degerman Kang Waimey

(57) ABSTRACT

Disclosed are a method and an apparatus for operating based on a power save mode in a wireless LAN. The method for operating based on the power save mode in a wireless LAN may comprise the steps of: switching an STA from a sleep mode to an active mode after the STA has been switched to a power save mode based on a listen interval, to receive a first beacon frame transmitted by an AP; monitoring a frame for the STA transmitted by the AP until a timer started when the STA is switched to the active mode expires, when the first beacon frame indicates data buffered for the STA; and switching the STA to the sleep mode after the timer expires, wherein the timer can be reset when the frame is transmitted.

8 Claims, 13 Drawing Sheets

(52) U.S. Cl.
CPC ............ *H04W 84/12* (2013.01); *Y02D 70/00* (2018.01); *Y02D 70/142* (2018.01); *Y02D 70/22* (2018.01)

(58) Field of Classification Search
CPC ... H04L 28/044; H04L 76/048; H04L 74/085; H04W 52/0216; H04W 52/0229; H04W 52/0235; H04W 48/12; H04W 28/044; H04W 76/048; H04W 74/085; H04W 52/0225; H04W 52/0258; H04W 76/28; G06F 1/3234
See application file for complete search history.

(56) References Cited

U.S. PATENT DOCUMENTS

| | | | | |
|---|---|---|---|---|
| 2013/0229963 A1* | 9/2013 | Asterjadhi | .......... | H04W 28/044 370/311 |
| 2014/0153459 A1* | 6/2014 | Shrivastava | ...... | H04W 52/0225 370/311 |
| 2014/0204822 A1* | 7/2014 | Park | .................... | H04W 68/025 370/311 |
| 2014/0281623 A1* | 9/2014 | Zhang | .................... | G06F 1/3234 713/323 |

* cited by examiner

FIG. 1
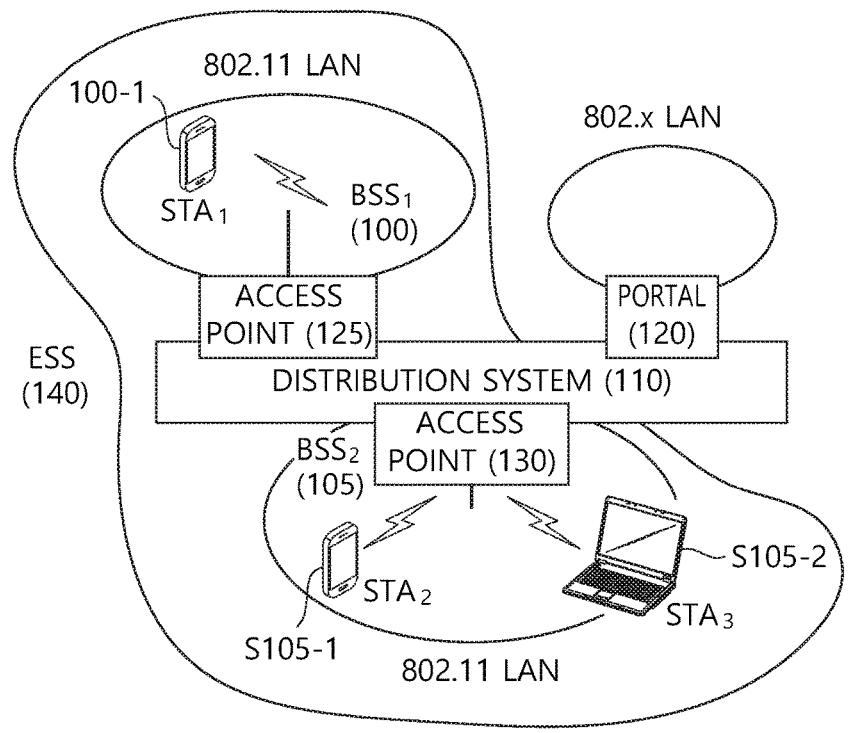
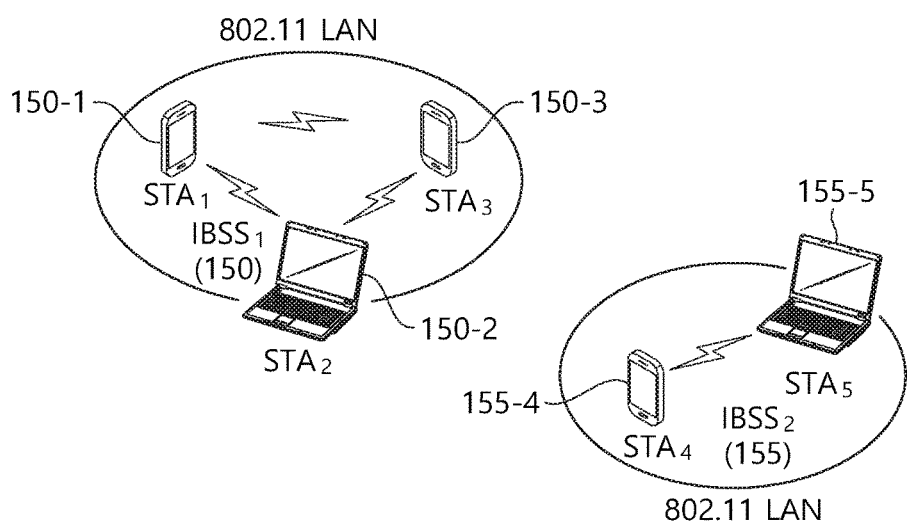

METHOD AND APPARATUS FOR OPERATING BASED ON POWER SAVE MODE IN WIRELESS LAN

CROSS-REFERENCE TO RELATED APPLICATIONS

This application is the National Stage filing under 35 U.S.C. 371 of International Application No. PCT/KR2015/000300, filed on Jan. 12, 2015, which claims the benefit of U.S. Provisional Application No. 61/925,649, filed on Jan. 10, 2014, and 62/100,068, filed on Jan. 6, 2015, the contents of which are all hereby incorporated by reference herein in their entirety.

BACKGROUND OF THE INVENTION

Field of the Invention

The present invention relates to wireless communication, and more particularly, to a method and an apparatus for operating based on a power save mode in a wireless local area network (WLAN).

Related Art

In IEEE 802.11, a power saving mechanism (or power saving mode) may be used to increase the life of a wireless local area network (WLAN) station (STA). An STA operating based on the power saving mode is capable of operating in an awake state or doze state in order to save power. The awake state is a state in which normal operations of the STA, such as frame transmission or reception or channel scanning, are possible. The doze state is a state in which power consumption is drastically reduced to make it impossible to transmit or receive a frame and to perform channel scanning. The STA operating in the power saving mode is usually in the doze state and switches to the awake state if necessary to reduce power consumption.

When the STA is operating for a long time in the doze state, power consumption of the STA is reduced. Accordingly, the life of the STA may increase. However, in the doze state, it is impossible to transmit or receive a frame. Thus, the STA may not stay for a long time in the doze state. When the STA has a pending frame in the doze state, the STA may switch to the awake state to transmit the frame to an AP. However, when the STA is in the doze state and the AP has a pending frame to transmit to the STA, the STA may not receive the pending frame from the AP and does not recognize that the AP has the pending frame. Accordingly, the STA may periodically switch to the awake mode to operate in order to acquire information on whether the AP has a pending frame and to receive the pending frame from the AP.

The AP may acquire information on an awake-mode operation timing of the STA and transmit information on whether the AP has a pending frame according to the awake-mode operation timing of the STA.

Specifically, the STA in the doze state may periodically switch from the doze state to the awake state to receive a beacon signal in order to receive information on whether there is a frame to receive from the AP. The AP may notify whether there is a frame to transmit to each STA based on a traffic indication map (TIM) included in the beacon frame. The TIM may be used to indicate the presence of a unicast frame to be transmitted to the STA, and a delivery traffic indication map (DTIM) may be used to indicate the presence of a multicast frame/broadcast frame to be transmitted to the STA.

SUMMARY OF THE INVENTION

The present invention provides a method for operating based on a power save mode in a wireless LAN.

The present invention also provides an apparatus for operating based on a power save mode in a wireless LAN.

In an aspect, a method for operating based on a power save mode in a wireless LAN, includes: being, by a station (STA), switched to the power save mode and thereafter, switched from a sleep mode to an active mode based on a listen interval in order to receive a first beacon frame transmitted by an access point (AP); monitoring, by the STA, a frame for the STA transmitted by the AP until a timer which starts at a switch point to the active mode expires when the first beacon frame indicates data buffered to the STA; and being, by the STA, switched to the sleep mode after the time expires, wherein the timer is reset when the frame is transmitted.

In another aspect, a station (STA) for operating based on a power save mode in a wireless LAN, includes: a radio frequency (RF) unit implemented to transmit or receive a radio signal; and a processor operatively connected with the RF unit, wherein the processor is implemented to be switched to a power save mode and thereafter, switch an operating mode of the STA from a sleep mode to an active mode based on a listen interval in order to receive a first beacon frame transmitted by an access point (AP), monitor a frame for the STA transmitted by the AP until a timer which starts at a switch time to the active mode expires when the first beacon frame indicates data buffered to the STA, and switch the operating mode of the STA to the sleep mode after the timer expires, and the timer is reset when the frame is transmitted.

An STA that operates in a power save mode can receive downlink data pended from an AP without transmitting a power saving (PS)-poll frame. Therefore, signaling overhead for transmitting the PS-poll frame can be reduced and a transmission delay can be reduced.

BRIEF DESCRIPTION OF THE DRAWINGS

FIG. 1 is a concept view illustrating the structure of a wireless local area network (WLAN).

DESCRIPTION OF EXEMPLARY EMBODIMENTS

Figure 2:
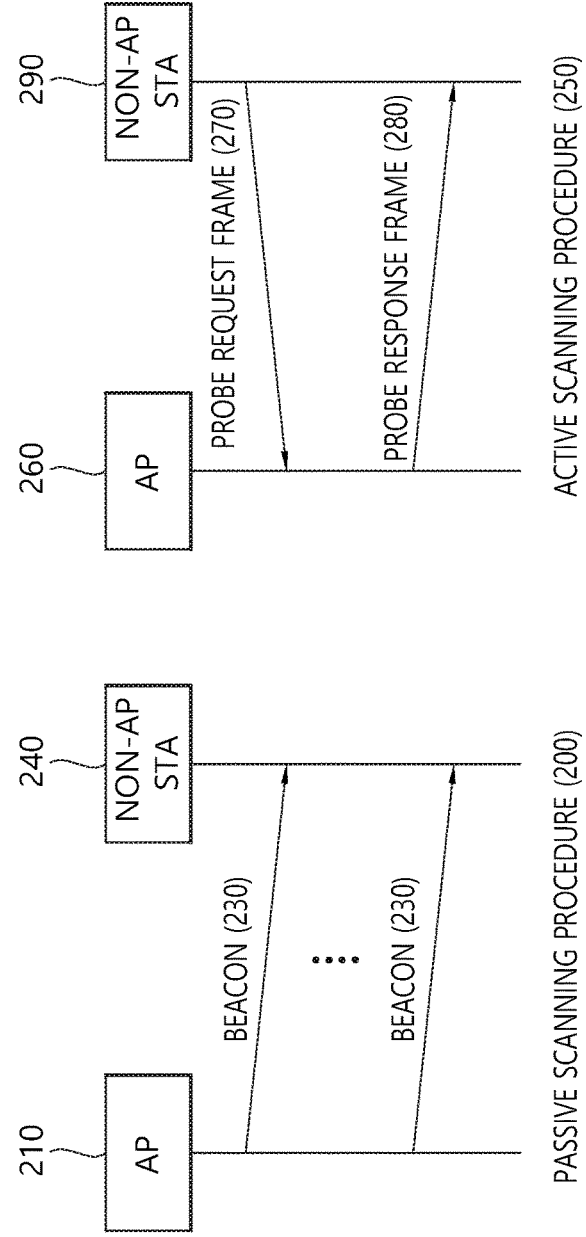
FIG. 2 is a conceptual view illustrating a scanning method in the wireless LAN.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (alternatively, or a frame) which an AP transmits to an STA may be expressed as downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

FIG. 2 is a conceptual view illustrating a scanning method in the wireless LAN.

Referring to FIG. 2, the scanning method may be divided into passive scanning 200 and active scanning 250.

Referring to a left side of FIG. 2, the passive scanning 200 may be performed by a beacon frame 230 periodically broadcasted by an AP 200. The AP 200 of the wireless LAN broadcasts the beacon frame 230 to a non-AP STA 240 at a specific period (for example, 100 msec). The beacon frame 230 may include information on a current network. The non-AP STA 240 receives the periodically broadcasted beacon frame 230 to scan the AP 210 and a channel to perform an authentication/association process by receiving the network information.

In the passive scanning method 200, the non-AP STA 240 just receives the beacon frame 230 transmitted by the AP 210 without transmitting the frame. Therefore, the passive scanning 200 has an advantage in that overall overhead generated due to transmission/reception of data in the network is small. However, since scanning cannot but be passively performed in proportion to the period of the beacon frame 230, a time required for performing the scanning relatively increases as compared with the active scanning method. Detailed description of the beacon frame is disclosed in Beacon Frame at Clause 8.3.3.2 of IEEE Draft P802.11-REVmb™/D12, November 2011 'IEEE Standard for Information Technology Telecommunications and information exchange between systems—Local and metropolitan area networks—Specific requirements Part 11, Wireless LAN Medium Access Control (MAC) and Physical Layer (PHY) Specifications (hereinafter, referred to as IEEE 802.11)' disclosed in November 2011. In the IEEE 802.11 ai, a beacon frame having another format may be additionally used and the beacon frame may be referred to as a fast initial link setup (FILS) beacon frame. Further, a measurement pilot frame may be used in a scanning procedure of a frame including only partial information of the beacon frame. The measurement pilot frame is disclosed in IEEE 802.11 8.5.8.3 measurement pilot format.

Further, a FILS discovery frame may be defined. The FILS discovery frame as a frame transmitted at a transmission period of the beacon frame in each AP may be a frame transmitted at a shorter period than the beacon frame. That is, the FILS discovery frame is a frame transmitted at a period having a smaller value than the transmission period of the beacon frame. The FILS discovery frame may include identifier information (SSID and BSSID) of the AP transmitting a detection frame. The FILS discovery frame is transmitted before the beacon frame is transmitted to the STA, and as a result, the STA may discover that the AP is present in the corresponding channel in advance. An interval at which the FILS discovery frame is transmitted in one AP is referred to as a FILS discovery frame transmission interval. The FILS discovery frame including some of the information included in the beacon frame may be transmitted.

Referring to a right side of FIG. 2, in the active scanning 250, a non-AP STA 290 transmits a probe request frame 270 to an AP 260 to dominantly perform scanning.

The AP 260 receives the probe request frame 270 from the non-AP STA 290 and thereafter, may transmit a probe response frame 280 including the network information to the non-AP STA 290 after waiting for a random time in order to prevent a frame collision. The non-AP STA 290 may obtain the network information and stop the scanning process based on the received probe response fame 280.

The active scanning 250 has an advantage in that since the non-AP STA 290 dominantly performs the scanning, a time required for using the active scanning 250 in the scanning is short. However, the active scanning 250 has a disadvantage in that since the non-AP STA 290 needs to transmit the probe request frame 270, network overhead for transmission and reception of the frame increases. The probe request frame 270 is disclosed in IEEE 802.11 8.3.3.9 and the probe response fame 280 is disclosed in IEEE 802.11 8.3.3.10.

After the scanning ends, the AP and the non-AP STA may perform the authentication procedure and the association procedure.

Figure 3:
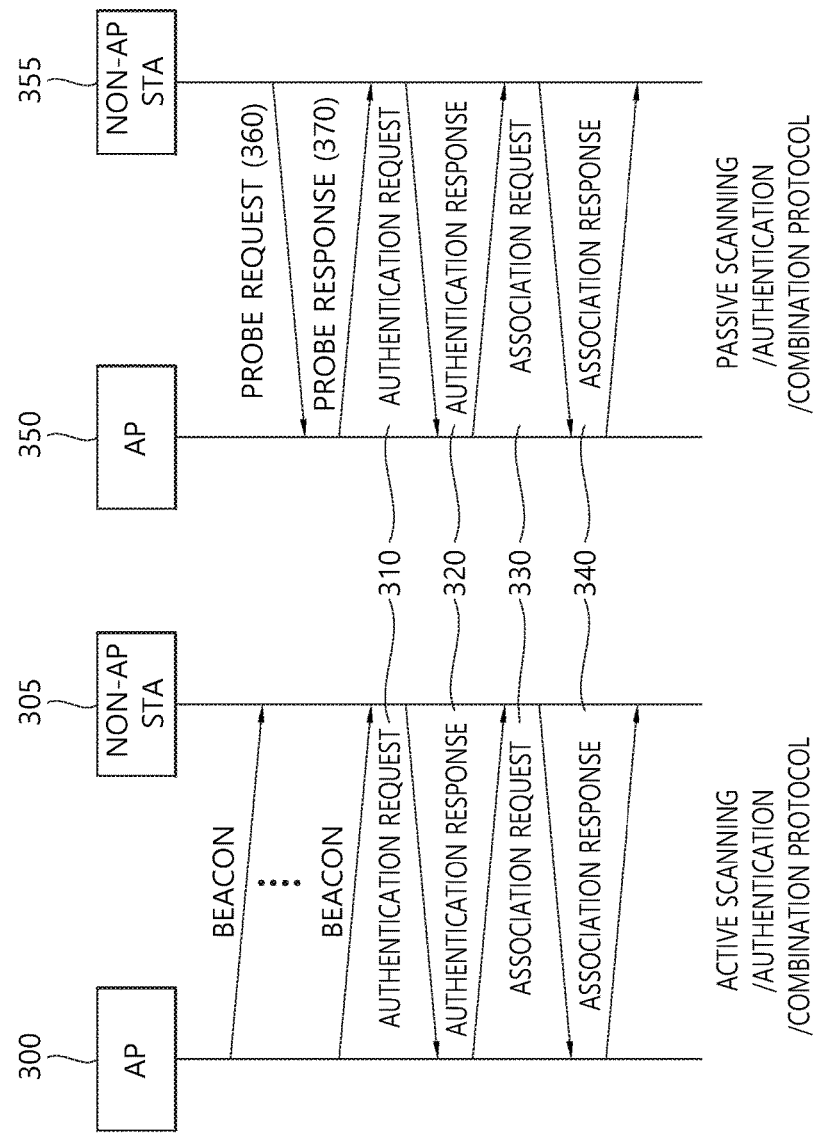
FIG. 3 is a conceptual view illustrating an authentication procedure and an association procedure performed after a scanning procedure of an AP and an STA.

FIG. 3 is a conceptual view illustrating an authentication procedure and an association procedure performed after a scanning procedure of an AP and an STA.

Referring to FIG. 3, after the passive/active scanning is performed, the authentication procedure and the association procedure with one AP among the scanned APs may be performed.

The authentication procedure and the association procedure may be performed through for example, a 2-away handshaking. A left side of FIG. 3 is a conceptual view illustrating the authentication and association procedures after the passive scanning and a right side of FIG. 3 is a conceptual view illustrating the authentication and association procedures after the active scanning.

The authentication and association procedures may be similarly performed by switching an authentication request frame 310/authentication response frame 320 and an association request frame 330/association response frame 340 between the c and the non-AP STA 305/355.

In the authentication procedure, the non-AP STA 305/355 may transmit an authentication request frame 310 to the AP 300/350. The AP 300/350 may transmit an authentication response frame 320 to the non-AP STA 305/355 as a response to the authentication request frame 310. An authentication frame format is disclosed in IEEE 802.11 8.3.3.11.

In the association procedure, the non-AP STA 305/355 may transmit an association request frame 330 to the AP 300/350. The AP 300/350 may transmit an association response frame 340 to the non-AP STA 305/355 as a response to the association request frame 330. The association request frame 330 transmitted to the AP includes information on a capability of the non-AP STA 305/355. The AP 300/350 may determine whether to support the non-AP STA 305/355 based on the capability information of the non-AP STA 305/355. When the AP 300/350 may support the non-AP STA 305/355, the AP 300/350 may transmit the association response frame 340 to the non-AP STA 305/355. The association response frame 340 may include whether the association response frame 340 is accepted and a reason of the acceptance, and capability information supportable by the AP 300/350. An association frame format is disclosed in IEEE 802.11 8.3.3.5/8.3.3.6.

After the association procedure is performed between the AP and the non-AP STA, data may be normally transmitted and received between the AP and the non-AP STA. When the association procedure between the AP and the non-AP STA is unsuccessful, the association procedure with the AP may be performed again or the association procedure with another AP may be performed based on the reason why the association is unsuccessful.

When the STA is associated with the AP, the STA may be assigned with an association identifier (AID) from the AP. The AID assigned to the STA may be a unique value in one BSS and the current AID may be one value of 1 to 2007. 14 bits are assigned for the AID, and as a result, a maximum of 16383 may be used as the value of the AID, but values of 2008 to 16383 are reserved.

In an IEEE 802.1 standard, a power save mechanism is provided in order to increase the life-span of the STA in the wireless LAN.

For power save, the STA may operate based on two modes (or states) of an active mode (or awake state) and a sleep mode (or doze state). The STA may operate in the power save mode based on the awake state or the doze state.

The STA in the active mode (or awake state) may perform normal operations such as transmission or reception of the frame, channel scanning, and the like. On the contrary, the STA in the sleep mode (or doze state) does not perform the transmission or reception of the frame and the channel scanning in order to reduce power consumption. The STA that operates in the power save mode is maintained in the doze state I order to reduce the power consumption and when necessary, the STA is switched (transitioned) to the awake state to perform communication with the AP.

As a maintaining time of the doze state of the STA increases, the power consumption of the STA may decrease and the life-span may also increase. However, in the doze state, the transmission or reception of the frame by the STA is impossible. When an uplink frame pended to the STA is present, the STA is switched from the doze state to the active state and the STA may transmit the uplink frame to the AP. On the contrary, when a pended frame to be transmitted to the STA in the doze state is present in the AP, the AP may not transmit the frame pended to the STA until the STA is switched to the awake mode.

Therefore, the STA may sometimes be switched from the doze state to the awake state and receive information indicating whether the frame pended for the STA is present from the AP. The AP may transmit to the STA information indicating whether downlink data pended for the STA is present by considering a switch point of the STA to the awake state.

In detail, the STA is periodically switched from the doze state to the awake state in order to receive the information indicating whether the frame pended for the STA is present to receive the beacon frame. The beacon frame as a frame used for passive scanning of the STA may include information on a capability of the AP. The AP may transmit the beacon frame to the STA periodically for example, 100 msec).

Figure 4:
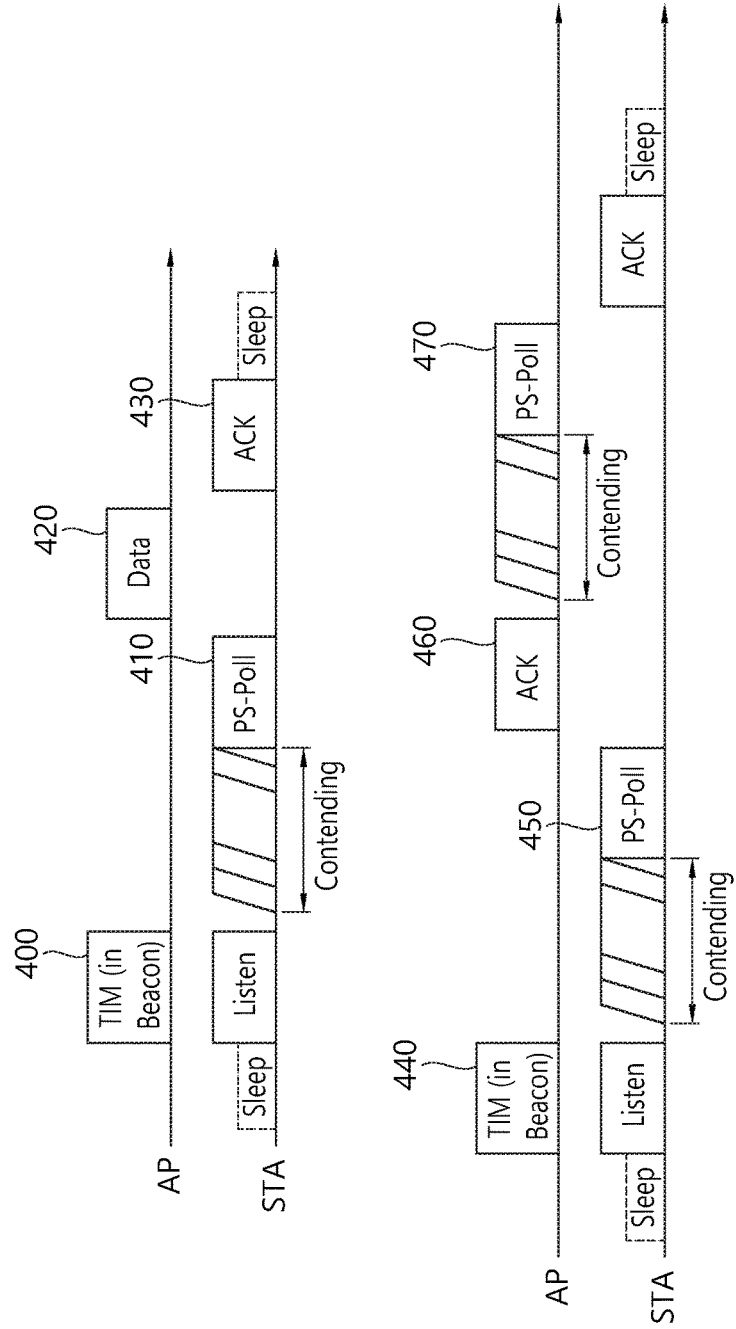
FIG. 4 is a conceptual view illustrating a beacon frame based power save method.

FIG. 4 is a conceptual view illustrating a beacon frame based power save method.

Referring to FIG. 4, the AP may periodically transmit the beacon frame and the STA is periodically switched from the doze state to the awake state by considering a transmission timing of the beacon frame to receive the beacon frame.

The beacon frame may include a traffic indication map (TIM) element. The TIM element may be used for transmitting information on downlink data for the STA pended to the AP. For example, the TIM element may transmit the frame pended to the STA based on a bitmap.

The TIM element may be divided into a TIM or a delivery TIM (DTIM). The TIM may indicate existence of the pended downlink data to be transmitted based on unicast to the STA. The DTIM may indicate existence of the pended downlink data to be transmitted based on broadcast/multicast.

The upper part of FIG. 4 discloses a method in which the AP transmits a downlink frame based on an immediate response to a power saving-poll frame.

Referring to the upper part of FIG. 4, the STA may receive the information on the existence of the downlink data pended for the STA from the AP based on the TIM of a beacon frame 400. The STA may transmit a PS-poll frame 410 to the AP. The AP may receive the PS-poll frame 410 from the STA and transmit a downlink frame 420 to the STA as the immediate response to the PS-poll frame 410. The immediate response of the AP to the PS-poll frame may be performed by receiving the PS-poll frame and short interframe space (SIFS).

The STA may transmit an ACK frame 430 as a response to the downlink frame. When the transmission of the downlink data pended for the STA by the AP ends, the STA may be switched (transitioned) to the doze state again.

A lower part of FIG. 4 discloses a method in which the PA transmits the downlink frame based on a deferred response to the PS-poll frame.

Referring to the lower part of FIG. 4, the STA may receive the information on the existence of the downlink data pended for the STA from the AP based on the TIM of a beacon frame 440. The STA may transmit a PS-poll frame 450 to the AP. The AP may receive the PS-poll frame 450 from the STA and transmit an ACK frame 460 to the STA as the response to the PS-poll frame 450. The AP may transmit a downlink frame 470 including the pended downlink frame to the STA after transmitting the ACK frame 460. The STA may monitor the downlink frame 470 transmitted to the STA by the AP after receiving the ACK frame 460.

Similarly, when the transmission of the downlink data pended for the STA by the AP ends, the STA may be switched (transitioned) from the awake state to the doze state again.

Figure 5:
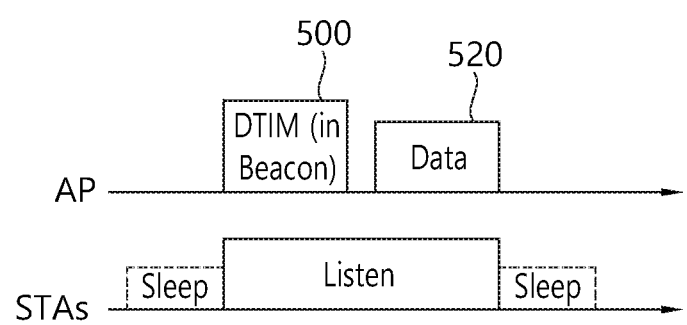
FIG. 5 is a conceptual view illustrating a beacon frame based power save method.

FIG. 5 is a conceptual view illustrating a beacon frame based power save method.

In FIG. 5, a case in which the DTIM is transmitted through a beacon frame 500 is disclosed. The beacon frame 500 may include the DTIM. As described above, the DTIM may indicate the existence of the pended downlink data to be transmitted based on the broadcast/multicast.

Referring to FIG. 5, the AP may transmit the beacon frame 500 including the DTIM to the STA. The STA may receive the beacon frame 500 including the DTIM and thereafter, maintain the awake state without transmitting the PS-poll frame and monitor transmission of a downlink frame 520. The AP may transmit the downlink frame 520 through a multi-cast method or a broadcast method to the STA.

The existing TIM element based power save mechanism (alternatively, power save method) disclosed in FIGS. 4 and 5 may have the following problem. First, signaling overhead of the PS-poll frame may exist. The STA needs to transmit the PS-poll frame to the AP in order to receive the TIM and receive the downlink data. After the STA is switched from the doze state to the awake state, the STA may transmit the PS-poll frame to the AP through a contention based access. When a plurality of STAs is simultaneously switched to the awake mode to transmit the PS-poll frame, it may be difficult to transmit the PS-poll frame due to contention among the plurality of STAs. Further, a delay which occurs until the STA receives the downlink frame after receiving the beacon frame from the AP may be large due to the contention among the STAs. The STA needs to transmit the PS-poll frame and receive the ACK frame for the PS-poll frame before receiving the TIM and receiving the downlink data.

Hereinafter, a method for reducing the signaling overhead of the STA which operates in the power save mode and the receiving delay of the downlink data is disclosed in an embodiment of the present invention. Hereinafter, the doze state may be used as the same meaning as the sleep mode and the awake state may be used as the same meaning as the active mode. In the doze state, the transmission or reception of the frame by the STA may not be performed.

Hereinafter, in the embodiment of the present invention, transmission from the AP to the STA may be expressed as a term called downlink transmission. A PPDU, a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame.

Further, transmission from the STA to the AP may be expressed as a term called uplink transmission. A PPDU, a frame, and data transmitted through the uplink transmission may be expressed as terms such as an uplink PPDU, an uplink frame, and uplink data, respectively.

Figure 6:
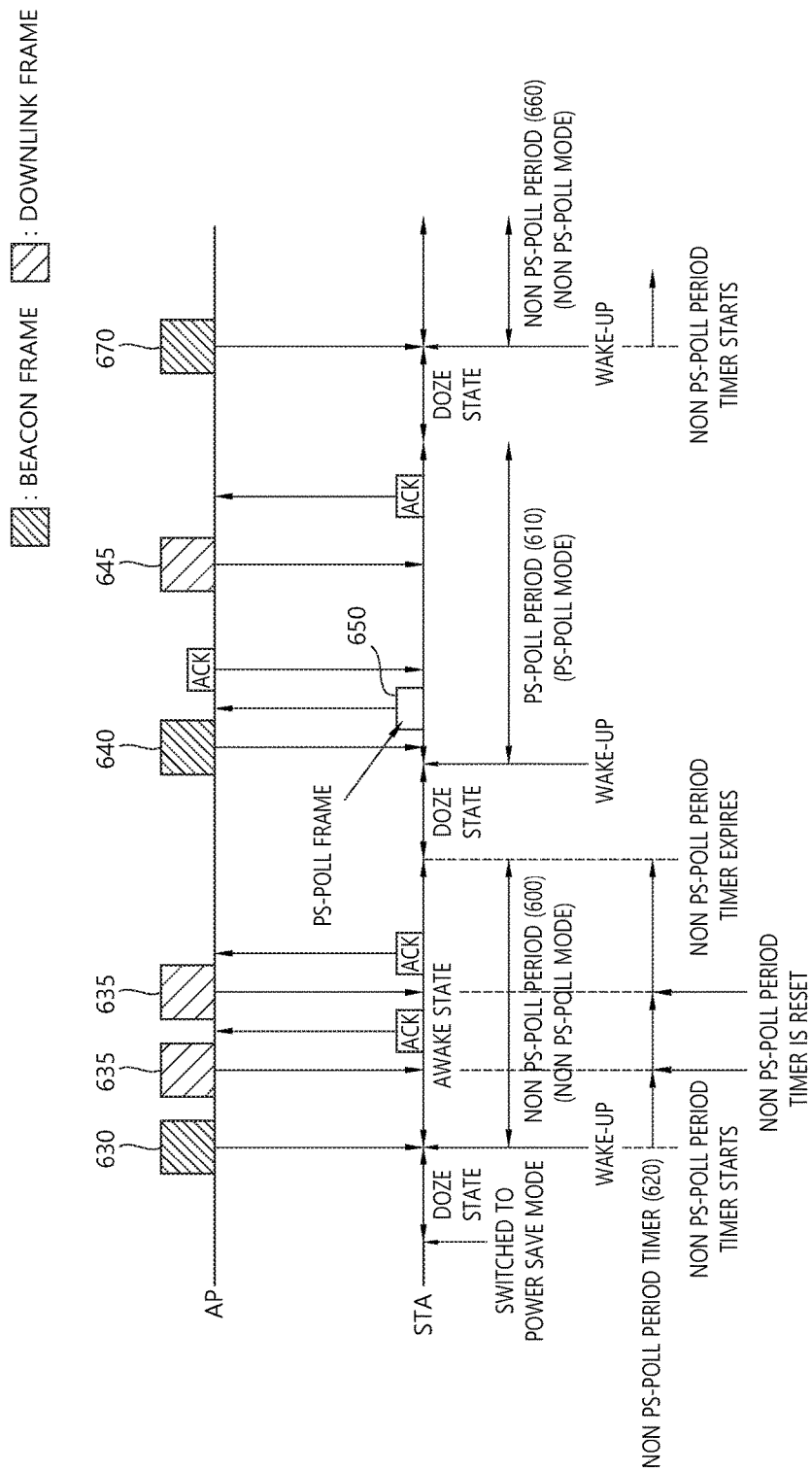
FIG. 6 is a conceptual view illustrating a power save method according to an embodiment of the present invention.

FIG. 6 is a conceptual view illustrating a power save method according to an embodiment of the present invention.

In FIG. 6, a non PS-poll period 600 and a PS-poll period 610 are defined and a method in which the STA receives the downlink frame (alternatively, downlink data) transmitted by the AP in the non PS poll period 600 and the PS-poll interval 610 is disclosed.

In the non PS poll period 600, the STA may receive a pended downlink frame (buffered (alternatively, pended) downlink data 635 without transmitting the PS-poll frame. In detail, when the STA receives the beacon frame 630 including the TIM indicating the downlink data pended for the STA, the STA may receive the downlink frame 635 including the pended downlink data from the AP. The STA may operate in the awake state (alternatively, active mode) during a predetermined time period in the non PS-poll period 600. In the non PS-poll period 600, a downlink frame receiving operation of the STA may be expressed as a term called a non PS-poll mode operation.

A start point of the non PS-poll period 600 may be a switch point to a first awake state after switching a non power save mode (alternatively, the active mode) of the STA to the power save mode or a receiving point of a first beacon frame 630 by the STA after switching to the power save mode of the STA. Hereinafter, the method will be described by assuming that the start point of the non PS-poll period 600 is the switch (alternatively, transition) point to the awake state for easy description. The length (alternatively, duration) of the non PS-poll period 600 may be determined based on a timer that determines the length (alternatively, end) of the non PS-poll period 600. The timer for determining the length (alternatively, whether the non PS-poll period 600 ends) of the non PS-poll period 600 may be expressed as a term called a non PS-poll period timer 620.

The non PS-poll period timer 620 may start at the start point of the non PS-poll period 600. When the STA does not receive the downlink frame from the AP (alternatively, when the AP does not transmit the downlink frame 635 for the STA), a set timer value decreases, and as a result, the non PS-poll period timer 620 may expire. When the STA receives the downlink frame 635 from the AP before the non PS-poll period timer 620 (alternatively, when the AP transmits the downlink frame 635 for the STA), the non PS-poll period timer 620 may restart (alternatively, reset) again.

According to another embodiment of the present invention, when the TIM included in the beacon frame 630 received by the STA that operates in the non PS-poll mode indicates the existence of the downlink data pended to the STA, the non PS-poll period timer 620 may start.

When the non PS-poll period timer 620 expires, the non PS-poll period timer 620 may end and the STA may be switched to the doze state.

When the non PS-poll period timer 620 starts, the non PS-poll period timer 620 may decrease to 0 from a set initial value. The initial value of the non PS-poll period timer 620 may be transmitted through the association response frame transmitted by the AP in an initial access procedure of the STA and the AP. The initial value of the non PS-poll period timer 620 may be a fixed value or a separately set variable value.

After the non PS-poll period 600, the STA switched to the doze state is switched to the awake state based on a listen interval to receive a beacon frame 640. A PS-poll period 610 may start at the switch point of the STA to the awake state based on the listen interval after the non PS-poll period 600 or a receiving point of the beacon frame 640 after the STA is switched to the awake state based on the listen interval after the non PS-poll period 600 of the STA. Hereinafter, the method will be described by assuming that the start point of the PS-poll period 610 is the switch (alternatively, transition) point to the awake state based on the listen interval for easy description. In the PS-poll period 610, the downlink frame receiving operation of the STA may be expressed as a term called a PS-poll mode operation.

The STA that operates in the PS poll mode may perform the downlink frame receiving operation based on the PS-poll frame 650 as described above in FIGS. 4 and 5. In detail, when the STA receives the beacon frame 640 including the TIM indicating the downlink data pended for the STA, the STA may transmit the PS-poll frame 650 to the AP. The AP may receive a downlink frame 645 including the downlink data pended to the STA. When the downlink frame pended for the STA is not present in the AP, the STA may be switched to the doze state. The STA that operates in the PS-poll period 610 may be expressed as an STA that operates in the PS-poll mode.

After the PS-poll period 610, the STA switched to the doze state is switched to the awake state based on the listen interval again and operates in the non PS-poll mode again to receive a beacon frame 670 from the AP. In detail, a next non PS-poll period 660 may start at the switch point of the STA to the awake state based on the listen interval after the PS-poll period 610 or a receiving point of the beacon frame 670 after the STA is switched to the awake state based on the listen interval after the PS-poll period 610 of the STA. Similarly, when the non PS-poll period timer 620 expires, the non PS-poll period 620 may end. Hereinafter, the method will be described by assuming that the start point of the non PS-poll period 660 is the switch point to the awake state for easy description.

When the following condition is satisfied, the non PS-poll period (alternatively, non PS-poll mode) may start.

When STA is switched from the non power save mode (alternatively, active mode) to the power save mode and switched to the awake state for receiving the first beacon frame (alternatively, switched to the power save mode and thereafter, first switched to the awake state based on the listen interval), the non PS-poll period may start. The listen interval may be a switch interval of the STA to the awake state for receiving the beacon frame. As another expression, the listen interval may indicate how frequently the STA that operates in the power save mode is switched to the awake state in order to listen the beacon frame.

Alternatively, when the STA receives the downlink data (new downlink data and buffered (alternatively, pended) downlink data) pended for the STA from the AP and is switched to the doze state in the PS-poll period, the STA may be switched to the awake state based on the next listen interval and thereafter, the non PS-poll period may start.

According to the embodiment of the present invention, when a signal to noise ratio (SNR) of a medium does not satisfy a threshold, the STA may not operate in the non PS-poll mode. That is, the non PS-poll period may not be assigned to the STA. The SNR threshold for determining the assignment of the non PS-poll period may be included in the association request frame and the association response frame transmitted or received in the initial access procedure of the STA. In detail, the STA may transmit the association request frame including information on the SNR threshold or the AP may transmit the association response frame including the information on the SNR threshold.

Further, according to the embodiment of the present invention, when mobility of the STA is larger than a mobility threshold, the STA may not operate in the non PS-poll mode. This will be described below in detail.

Figure 7:
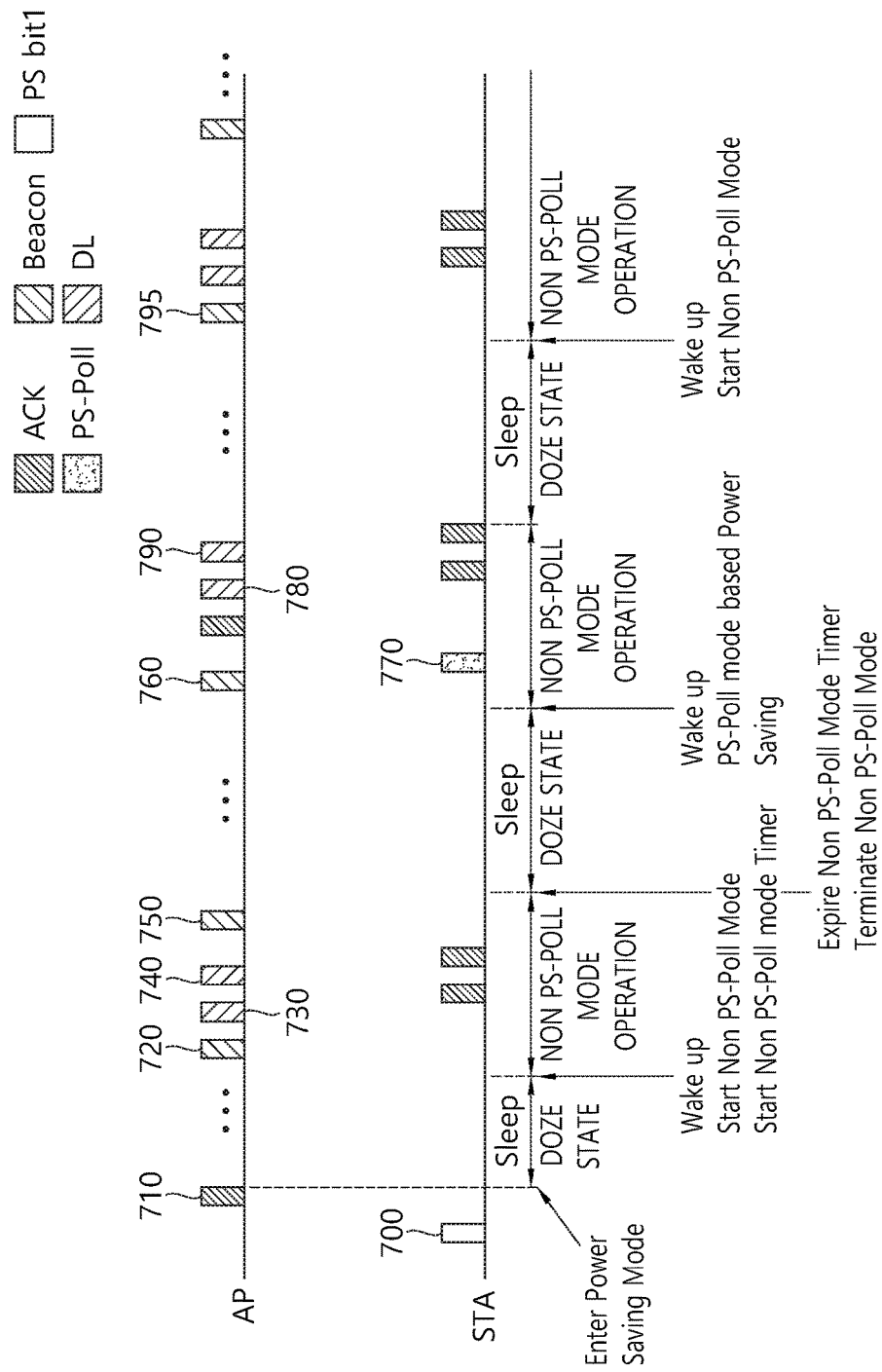
FIG. 7 is a conceptual view illustrating a power save method according to an embodiment of the present invention.

FIG. 7 is a conceptual view illustrating a power save method according to an embodiment of the present invention.

In FIG. 7, reception of the downlink data by the STA in the non PS-poll period and the PS-poll period is disclosed.

Referring to FIG. 7, the STA may transmit a frame (a power save mode switch indication frame 700) including information indicating that the STA operates in the power save mode to the AP. For example, the STA transmits the power save mode switch indication frame 700 in which a power save (PS) bit) for indicating that the STA operates in the power save mode is set to the AP to announce the switch of the STA to the power save mode to the AP.

The STA may receive from the AP an ACK frame 710 for the power save mode switch indication frame 700 and be switched to the doze state.

The STA is switched to the doze state and thereafter, switched to the awake mode based on the listen interval to receive a first beacon frame 720 after being switched to the power save mode.

According to the embodiment of the present invention, when the STA is switched from the non power save mode to the power save mode and is switched to the awake state based on the listen interval, the non PS-poll period may start. The STA may operate in the non PS-poll mode during the non PS-poll period. In detail, the STA may not transmit the PS-poll frame during the non PS-poll period. The STA may actuate a non PS-Poll period timer when the non PS-poll period starts. The non PS-Poll period timer of the STA for determining whether the non PS-poll period ends may start together with the start of the non PS-poll period.

The STA may determine whether the downlink data pended for the STA is present based on the TIM of the beacon frame 720. For example, when the TIM included in the beacon frame indicates the existence of the downlink data pended for the STA, the STA may monitor downlink frames 730 and 740 transmitted to the STA by the AP.

The STA that operates in the non PS-poll mode may monitor the downlink frames 730 and 740 until the non PS-poll period timer expires without transmitting the PS-poll frame.

When the STA does not receive the downlink frames 730 and 740 until the non PS-poll period timer expires, the STA may be switched to the doze state. A point when the non PS-poll period timer expires may be an end point of the non PS-poll period. The STA may be maintained in the doze state until being switched to the awake state again based on the listen interval after the non PS-poll period ends.

As illustrated in FIG. 7, when the STA receives the downlink frame 730 until the non PS-poll period timer expires, the STA may be maintained in the awake state. When the STA receives the downlink frames 730 and 740 until the non PS-poll period timer expires, the STA may reset the non PS-poll period timer to an initial value, be maintained in the awake state, and monitor an additional downlink frame for the STA. When the STA does not receive the additionally downlink frame until the non PS-poll period timer expires after the non PS-poll period timer is reset, the STA may be switched to the doze state. Alternatively, when the STA receives a beacon frame 750 including the TIM indicating that there is no data pended for the STA during the non PS-poll period, the operation of the non PS-poll period timer may stop and the STA may be switched to the awake state.

The STA is switched to the awake state based on the listen interval after the non PS-poll period to operate in the PS poll mode. The STA that operates in the PS-poll mode may determine whether the downlink data pended for the STA is present based on the TIM of the beacon frame 760. When the downlink frame pended for the STA is not present, the STA may be switched to the doze state again. On the contrary, when the downlink frame pended for the STA is not present, the STA may transmit a PS-poll frame 770 to the AP, receive an ACK frame for the PS-poll frame 770, and receive downlink frames 780 and 790 including new downlink data (alternatively, buffered (alternatively, pended) downlink data).

When the pended downlink data is not present in the AP (for example, when a MoreData field of the transmitted downlink frame is set to 0), the STA that operates in the PS poll mode may be switched to the doze state.

The STA may not receive the pended downlink data due to the end of the non PS-poll period timer during the non PS-poll period. Even in this case, the STA may receive the downlink data pended to the STA based on the PS-poll mode operation during the PS-poll period.

The STA is switched to the awake state based on the listen interval after operating in the PS-poll mode and being switched to the doze state to operate in the non PS poll mode. The STA may receive a beacon frame 795 and monitor the downlink data without transmitting the PS-poll frame based on the non PS-poll period timer.

Figure 8:
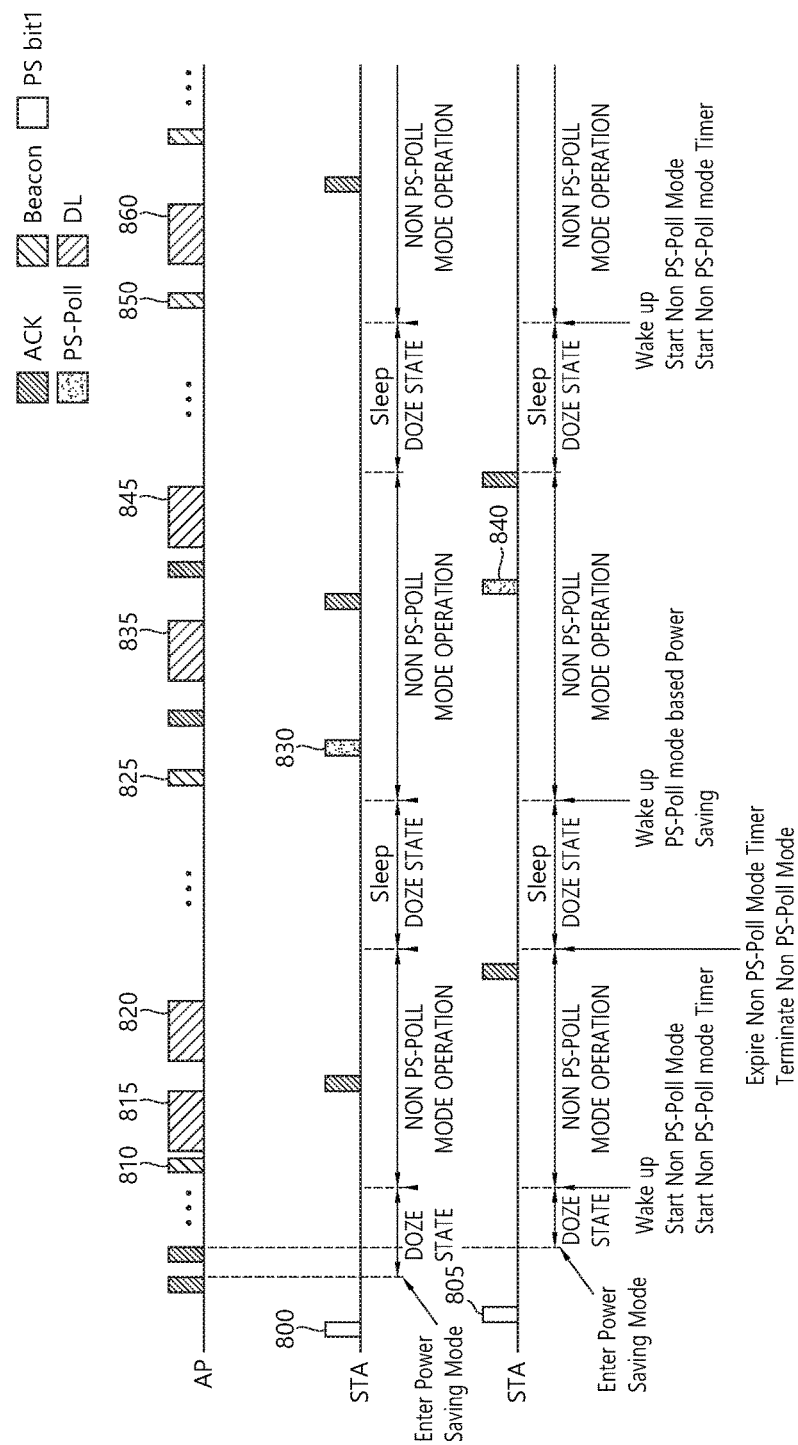
FIG. 8 is a conceptual view illustrating a power save method according to an embodiment of the present invention.

FIG. 8 is a conceptual view illustrating a power save method according to an embodiment of the present invention.

In FIG. 8, reception of the downlink data by the plurality of STAs in the non PS-poll period and the PS-poll period is disclosed. In FIG. 8, a case in which TIMs included in beacon frames 810, 820, and 850 indicate downlink data pended for each of STA1 and STA2 is assumed.

Referring to FIG. 8, each of the STA1 and the STA2 may transmit to the AP power save mode switch indication frames 800 and 850 indicating switching to the power save mode and be switched from the non power save mode to the power save mode.

Each of the STA1 and the STA2 may receive from the AP ACK frames for the power save mode switch indication frames 800 and 805 and be switched to the doze state.

The STA1 and the STA2 may be switched to the awake mode based on the listen interval after being switched to the doze state and operate based on the non PS-poll mode to receive downlink frames 815 and 820 from the AP. For example, the STA1 may be maintained in the awake state until the non PS-poll period timer expires and monitor the downlink frame 815 for the STA1 transmitted by the AP. The AP may transmit to the STA1 downlink frame 1 815 including the downlink data pended for the STA1. The STA1 may receive the downlink frame 1 815 and transmit the ACK frame for the downlink frame 1 815 to the AP. The STA1 may receive the downlink frame 1 815 and thereafter, reset the non PS-poll period timer. The reset non PS-poll period timer may expire when an additional downlink frame for the STA1 is not transmitted. The STA1 may be switched to the doze state when the non PS-poll period timer expires.

Similarly, the STA2 may be maintained in the awake state until the non PS-poll period timer expires and monitor the downlink frame 820 for the STA2 transmitted by the AP. The AP may transmit to the STA2 downlink frame 2 820 including the downlink data pended for the STA2. The STA2 may receive the downlink frame 2 820 and transmit the ACK frame for the downlink frame 2 820 to the AP. The STA2 may receive the downlink frame 2 820 and thereafter, reset the non PS-poll period timer. The reset non PS-poll period timer may expire when an additional downlink frame for the STA2 is not transmitted. The STA2 may be switched to the doze state when the non PS-poll period timer expires.

Referring the non PS-poll period, transmission of the PS-poll frame by each of the STA1 and the STA2 that operate in the non PS-poll mode may not be performed. When the transmission of the PS-poll frame by each of the STA1 and the STA2 is not performed, congestion of the medium and signaling overhead for transmitting the PS-poll frame due to the PS-poll frame may be reduced. Further, each of the STA1 and the STA2 may not transmit the PS-poll frame but receive the downlink frame. Therefore, the receiving delay of the downlink frame by each of the STA1 and the STA2 may be reduced.

The STA1 and the STA2 are switched to the awake state based on the listen interval after operating in the non PS-poll mode and being switched to the doze state to operate in the PS poll mode. In FIG. 8, a case in which the listen intervals of the STA1 and the STA2 are the same as each other is assumed.

The STA1 and the STA2 may transmit PS-poll frames 830 and 840 to the AP through the contention based channel access, respectively. In FIG. 8, a case in which the STA obtains a channel access authority earlier than the STA2. The STA1 may obtain the channel access authority earlier than the STA2 and transmit PS-poll frames 1 830 to the AP. The STA1 may receive the ACK frame to the AP as a response to the frame 1 830. The AP may transmit downlink frame 3 835 including the downlink frame pended for the STA1 after transmitting the ACK frame. The STA1 may receive the ACK frame to the AP as the response to the frame 3 835. The STA1 may be switched to the doze state when a field (for example, a MoreData field) indicating whether additionally pended downlink data included in the downlink frame 3 835 indicates whether the additionally pended downlink data is not present.

When medium occupancy by the STA1 ends, the STA2 may obtain the channel access authority through the contention based channel access and transmit PS-poll frame 2 to the AP. The STA2 may transmit the ACK frame to the AP as a response to PS-poll frame 2 840. The AP may transmit downlink frame 4 845 including the downlink frame pended for the STA2 after transmitting the ACK frame. The STA2 may transmit the ACK frame to the AP as the response to the frame 4 845. The STA2 may be switched to the doze state when a field (for example, a MoreData field) indicating whether additionally pended downlink data included in the downlink frame 4 845 indicates whether the additionally pended downlink data is not present.

Even when the STA1 and/or the STA2 may not receive the pended downlink data due to the end of the non PS-poll period timer during the non PS-poll period, the STA1 and/or the STA2 may receive the downlink data pended for the STA1 and/or the STA2 may based on the PS-poll mode operations of the STA1 and/or the STA2 during the PS-poll period.

The STA1 and the STA2 are switched to the awake state based on the listen interval again after operating in the PS-poll mode and being switched to the doze state to operate in the non PS poll mode again. Each of the STA1 and the STA2 may receive a beacon frame 850 and monitor downlink data 860 without transmitting the PS-poll frame based on the non PS-poll period timer.

Figure 9:
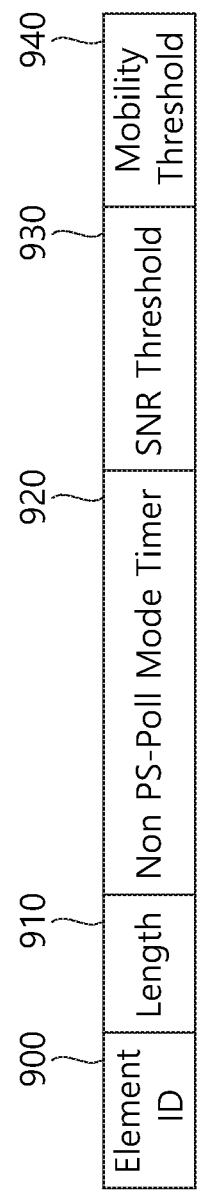
FIG. 9 is a conceptual view illustrating a non-PS-poll mode configuration element according to an embodiment of the present invention.

FIG. 9 is a conceptual view illustrating a non-PS-poll mode configuration element according to an embodiment of the present invention.

In FIG. 9, a non PS-poll mode configuration element (alternatively, a non PS-poll mode parameter set element) for the operation of the STA based on the non PS-poll mode is disclosed.

The non PS-poll mode configuration element may be transmitted through a separate frame, but the frame (for example, the beacon frame, the association request frame, or the association response frame) transmitted or received between the STA and the AP may be transmitted when the STA initially accesses the AP.

The non PS-poll mode configuration element may include an element ID field 900, a length field 910, a non PS-poll mode timer field 920, an SNR threshold field 930, and a mobility threshold field 940.

The element ID field 900 may include identifier information for indicating the non PS-poll mode configuration element.

The length field 910 may include information on the lengths of the non PS-poll mode timer field, the SNR threshold field, and the mobility threshold field.

The non PS-poll mode timer field 920 may include information on a default operating time of the STA in the non PS-poll mode. The default operating time may be a time when the STA is maintained in the awake state when the STA may not receive the downlink frame. As another expression, the non PS-poll mode timer field 920 may include information on an initial value of the PS-poll period timer.

The initial value (alternatively, the default operating time in the non PS-poll mode) of the PS-poll period timer may be a multiple of the listen interval. For example, when a value of the non PS-poll mode timer field 920, the STA may operate in the non PS-poll mode during 2*beacon interval. Alternatively, when the value of the non PS-poll mode timer field 920, the STA may operate in the non PS-poll mode during 3*beacon interval. As yet another method, the non PS-poll mode timer field 920 may directly include information on a micro second (ms)-wise time period for the operation of the STA in the non PS-poll mode.

The SNR threshold field 930 may include information on a minimum SNR (alternatively, SNR threshold) of the medium for the operation of the STA in the non PS-poll mode. As described above, the STA may operate in the non PS-poll mode when the SNR of the medium is equal to or more the minimum SNR.

The mobility threshold field 940 may include information on minimum mobility (alternatively, a mobility threshold) of the STA for the operation of the STA in the non PS-poll mode. The STA may operate in the non PS-poll mode only when the mobility is equal to or less the minimum mobility.

After the operation mode is switched from the non power save mode to the power save mode, the STA may basically operate based on the non PS-poll mode.

Figure 10:
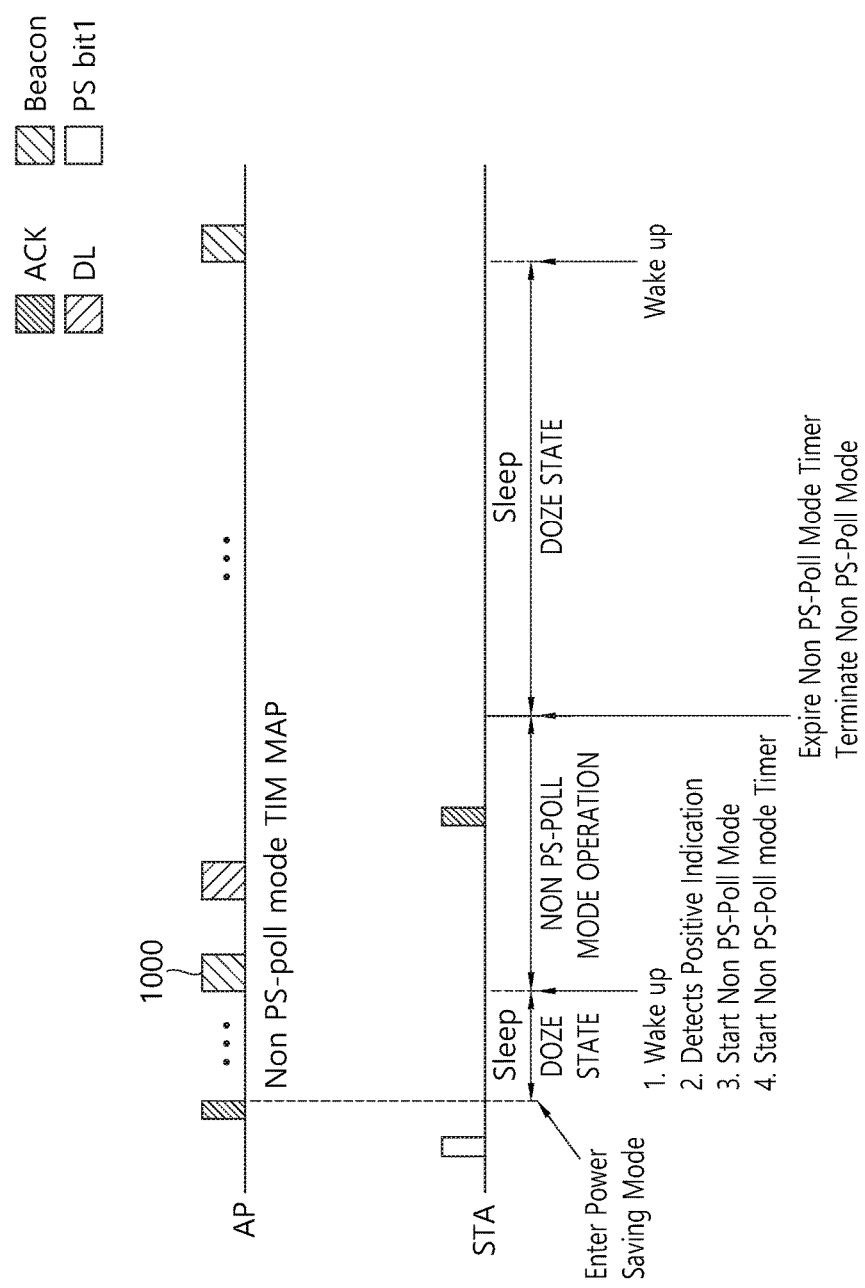
FIG. 10 is a conceptual view illustrating a power save operation of an STA according to an embodiment of the present invention.

FIG. 10 is a conceptual view illustrating a power save operation of an STA according to an embodiment of the present invention.

In FIG. 10, an operation of the STA in the non PS-poll mode based on a separate bitmap for the non-S-poll mode operation is disclosed.

Referring to FIG. 10, the non PS-poll mode TIM including information on the separate bitmap for the operation of the STA in the non PS-poll mode may be defined. The non PS-poll mode TIM may indicate receiving the downlink data (alternatively, downlink frame) based on the non PS-poll mode operation of the STA. The STA may receive a beacon frame 1000 based on the listen interval and the beacon frame 1000 may include the non PS-poll mode TIM. The non PS-poll mode TIM may include a bitmap field (for example, a partial virtual bitmap) and the bitmap field may include information on a non PS-poll mode TIM mode. When the non PS-poll mode TIM bitmap indicates data pended to the STA, the STA may operate in the non PS-poll mode.

The non PS-poll mode TIM may include a legacy TIM and a non PS-poll mode TIM of the beacon frame 1000.

The legacy TIM may include a legacy virtual TIM bitmap for indicating the downlink data pended for the STA. The non PS-poll mode TIM may include the non PS-poll mode TIM bitmap for indicating the downlink data pended for the STA. When the downlink data pended for the STA is indicated based on the legacy TIM, the STA operates in the PS-poll mode to receive the downlink frame. When the downlink data pended for the STA is indicated based on the non PS-poll TIM, the STA operates in the non PS-poll mode to receive the downlink frame.

The beacon frame 1000 transmitted by the AP may include the legacy TIM and the non PS-poll mode TIM of the beacon frame 1000.

When the legacy TIM of the beacon frame 1000 indicates the downlink data pended for the STA, the STA operates in the PS-poll mode to receive the downlink frame from the AP. In detail, when the bit value for the STA on the legacy virtual TIM bitmap included in the legacy TIM indicates the downlink data pended for the STA (alternatively, when the STA detects a positive indication at the position of the STA on the legacy virtual TIM bitmap included in the legacy TIM), the STA operates based on the PS-poll mode to receive the downlink frame from the AP.

As illustrated in FIG. 10, when the non PS-poll mode TIM of the beacon frame 1000 indicates the uplink data pended for the STA, the STA operates in the non PS-poll mode to receive the downlink frame from the AP. In detail, when the bit value for the STA on the non PS-poll mode TIM bitmap included in the non PS-poll mode TIM indicates the downlink data pended for the STA (alternatively, when the STA detects the positive indication at the position of the STA on the non PS-poll mode TIM bitmap included in the non PS-poll mode TIM), the STA operates based on the non PS-poll mode to receive the downlink frame from the AP.

That is, the STA may actuate the non PS-poll period timer and the STA may be switched to the doze state when the non PS-poll period timer expires.

The AP may indicate downlink data pended for one STA based on one bitmap of the legacy virtual TIM bitmap and the non PS-poll mode TIM bitmap. The STA may operate in the PS-poll mode or the non PS-poll mode based on one bitmap of the legacy virtual TIM bitmap and the non PS-poll mode TIM bitmap, which indicates the existence of the pended downlink data.

Figure 11:
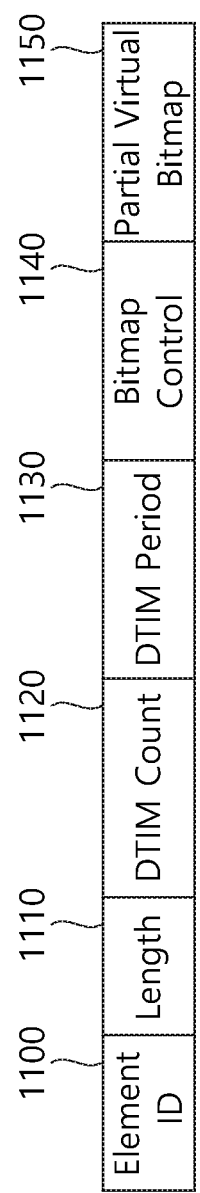
FIG. 11 is a conceptual view illustrating a non-PS-poll mode TIM element according to an embodiment of the present invention.

FIG. 11 is a conceptual view illustrating a non-PS-poll mode TIM element according to an embodiment of the present invention.

In FIG. 11, a non PS-poll mode TIM element for the operation of the STA based on the non PS-poll mode is disclosed.

The non PS-poll mode TIM element may be transmitted through the beacon frame.

The non PS-poll mode TIM element may include an element ID field 1100, a length field 1110, a DTIM count field 1120, a DTIM period field 1130, a bitmap control field 1140, and a partial virtual bitmap field 1150.

The non PS-poll mode TIM element may include an element ID field 1100, a length field 1110, a DTIM count field 1120, a DTIM period field 1130, a bitmap control field 1140, and a partial virtual bitmap field 1150.

The element ID field 1100 may include identifier information for indicating the non PS-poll mode TIM element.

The length field 1110 may include information on the lengths of the DTIM count field, the DTIM period field, the bitmap control field, and the partial virtual bitmap field.

The DTIM count field 1120 may indicate how many beacon frames are shown before a next DTIM. When a DTIM count is 0, the DTIM count of 0 may indicate that a current TIM is the DTIM.

The DTIM period field 1130 may include information on the number of beacon intervals among consecutive DTIMs. When all TIMS are the DTIMs, a value of the DTIM period field may be 1.

The bitmap control field 1140 may include bitmap offset information for analyzing a partial virtual bitmap field.

The partial virtual bitmap field 1150 may include information on the aforementioned non PS-poll mode TIM bitmap. The STA may determine whether to perform the non PS-poll mode based operation based on the non PS-poll mode TIM bitmap included in the partial virtual bitmap field 1150.

Figure 12:
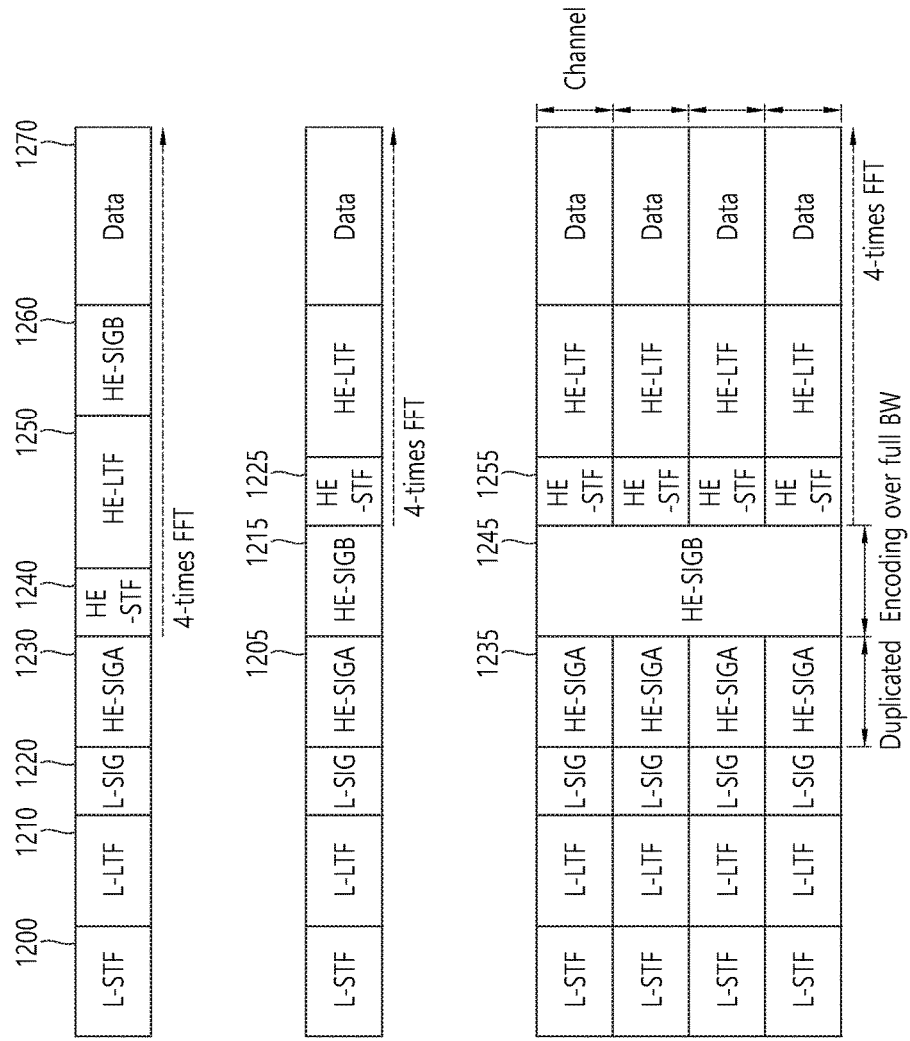
FIG. 12 is a conceptual view illustrating a PPDU format transferring a frame according to an embodiment of the present invention.

FIG. 12 is a conceptual view illustrating a PPDU format transferring a frame according to an embodiment of the present invention.

In FIG. 12, the PPDU formation according to the embodiment of the present invention is disclosed. The PPDU may include a PPDU header and a MAC protocol data unit (MPDU) (alternatively, a physical layer service data unit (PSDU)). The frame may correspond to the MPDU. The PPDU header of the PPDU format may be used as a meaning including a PHY header and a PHY preamble of the PPDU.

The PPDU format illustrated in FIG. 12 may be used for carrying the downlink frame, the ACK frame, and the like.

Referring to the upper part of FIG. 12, the PPDU header of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). From the PHY header to the L-SIG may be classified into a legacy part, a high efficiency (HE) part after the L-SIG An L-STF 1200 may include a short training orthogonal frequency division multiplexing (OFDM) symbol. The L-STF 1200 may be used for frame detection, automatic gain control (AGC), diversity detection, and coarse frequency/time synchronization.

An L-LTF 1210 may include a long training orthogonal frequency division multiplexing (OFDM) symbol. The L-LTF 1210 may be used for fine frequency/time synchronization and channel prediction.

An L-SIG 1220 may be used for transmitting control information. The L-SIG 1220 may include information regarding a data rate and a data length.

An HE-SIG A 1230 may include identification information on an STA for indicating a target STA to receive the downlink PPDU. The STA may determine whether the information included in the HE-SIG A 1230 receives the PPDU based on the identification information of the target STA. When the STA is indicated based on the HE-SIG A 1230 of the downlink PPDU, the STA may perform additional decoding for the downlink PPDU. Further, the HE-SIG A 1230 may include information on a resource to receive the downlink data (a frequency resource (alternatively, a sub band) (in orthogonal frequency division multiplexing (OFDMA)-based transmission) or in a multiple input multiple output (MIMO)-based transmission)).

An HE-STF 1240 may be used for improving automatic gain control estimation in an MIMO environment or an OFDMA environment.

An HE-LTF 1250 may be used for estimating a channel in the MIMO environment or the OFDMA environment.

An HE-SIG B 1260 may include information on a length modulation and coding scheme (MCS) of the physical layer service data unit (PSDU) for each STA, a tail bit, and the like.

A size of the inverse fast Fourier transform (IFFT) applied to the HE-STF 1240 and the field after the HE-STF 1240, and a size of the IFFT applied to the field before the HE-STF 1240 may be different from each other. For example, a size of the II-FT applied to the HE-STF 1240 and the field after the HE-STF 1240 may be four times larger than the size of the IFFT applied to the field before the HE-STF 1240. When the STA receives the downlink frame, the STA decodes the HE-SIG A 1230 in the downlink frame and may determine whether to decode the field after the HE-SIG A 1230 based on the identification information of the target STA included in the HE-SIG A 1330. In this case, when the identification information of the target STA included in the HE-SIG A 1230 indicates an identifier of the STA, the STA may perform decoding based on the FFT size changed from the HE-STF 1240 and the field after the HE-STF 1240. On the contrary, when the identification information of the target STA included in the HE-SIG A 1230 does not indicate the identifier of the STA, the STA may stop the decoding and set a network allocation vector (NAV). A cyclic prefix (CP) of the HE-STF 1240 may have a larger size than the CP of another field and the during the CP period, the STA may perform the decoding for the downlink PPDU by changing the FFT size.

An order of the field configuring the format of the PPDU illustrated in the upper part of FIG. 12 may be changed. For example, as illustrated in the stop of FIG. 12, an HE-SIG B 1215 of the HE part may be positioned immediately after the HE-SIG A 1205. The STA decodes up to the HE-SIG A 1205 and the HE-SIG B 1215 and receives required control information to set the NAV. Similarly, the size of the IFFT applied to the HE-STF 1225 and the field after the HE-STF 1225 may be the same as the size of the IFFT applied to the field before the HE-STF 1225.

The STA may receive the HE-SIG A 1205 and the HE-SIG B 1215. When the reception of the downlink PPDU is indicated by the identifier of the target STA of the HE-SIG A 1205, the STA may perform the decoding for the downlink PPDU by changing the FFT size from the HE-STF 1225. On the contrary, when the STA receives the HE-SIG A 1205 and the reception of the downlink PPDU based on the HE-SIG A 1205 is not indicated, the NAV may be set.

Referring to the lower part of FIG. 12, the downlink PPDU formation of downlink (DL) multi-user (MU) transmission is illustrated. The downlink PPDU may be transmitted to the STA through a different downlink transmission resource (a frequency resource or a spatial stream) based on the OFDMA. That is, the downlink data may be transmitted to a plurality of STAs through a plurality of sub bands based on the downlink PPDU format for the DL MU transmission. In the aforementioned embodiment, it is assumed that the AP transmits a downlink frame including a downlink data to one STA. However, according to another embodiment of the present invention, the downlink data may be transmitted to the plurality of STAs in an awake state in the downlink PPDU format for the DL MU transmission.

On the downlink PPDU, a previous field of the HE-SIG B 1245 may be transmitted from a different downlink transmission resource in a duplicated form. The HE-SIG B 1245 may be transmitted in an encoded form on the entire transmission resource. A field after the HE-SIG B 1245 may include individual information for the plurality of STAs receiving the downlink PPDU.

When the field included in the downlink PPDU is transmitted through the downlink transmission resource, the CRC for each field may be included in the downlink PPDU. On the contrary, when a specific field included in the downlink PPDU is encoded on the entire downlink transmission resource and transmitted, the CRC for each field may not be included in the downlink PPDU. Accordingly, the overhead for the CRC may be reduced. That is, the downlink PPDU format for the DL MU transmission according to the embodiment of the present invention uses the HE-SIG B 1245 in the encoded form on the entire transmission resource to reduce the CRC overhead of the downlink frame.

Like the downlink PPDU format for the DL MU transmission, the HE-STF 1255 and the field after the HE-STF 1255 may be encoded based on the different IFFT size from the field before the HE-STF 1255. Accordingly, when the STA receives the HE-SIG A 1235 and the HE-SIG B 1245 and indicates the reception of the downlink PPDU based on the HE-SIG A 1235, the STA may perform the decoding for the downlink PPDU by changing the FFT size from the HE-STF 1255.

Figure 13:
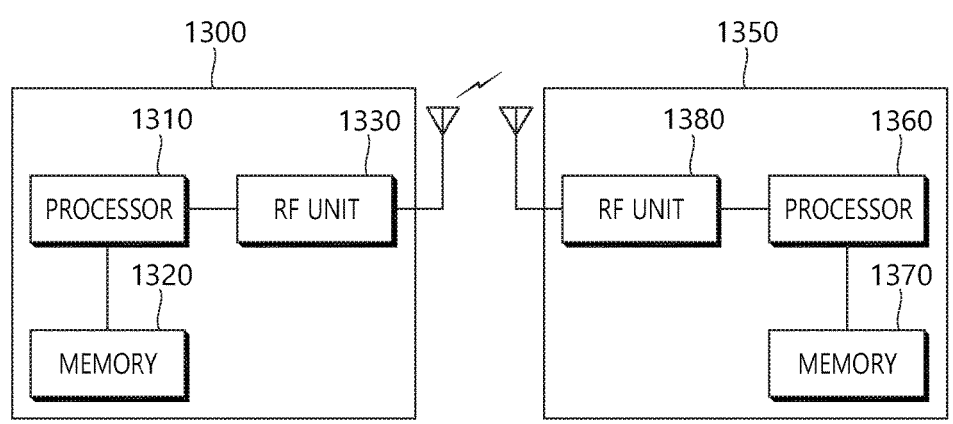
FIG. 13 is a block diagram illustrating a wireless apparatus to which an embodiment of the present invention can be applied.

FIG. 13 is a block diagram illustrating a wireless apparatus to which an embodiment of the present invention can be applied.

Referring to FIG. 13, the wireless apparatus 1300 as an STA capable of implementing the aforementioned embodiment may be an AP 1300 or a non-AP station (alternatively, STA) 1350.

The AP 1300 may include a processor 1310, a memory 1320, and a radio frequency (RF) unit 1330.

The RF unit 1330 is connected with the processor 1310 to transmit and/or receive a radio signal.

The processor 1310 implements a function, a process, and/or a method which are proposed in the present invention. For example, the processor 1310 may be implemented to perform the operation of the wireless apparatus according to the embodiment of the present invention. The processor may perform the operation of the wireless apparatus disclosed in the embodiment of FIGS. 1 to 12.

For example, when the processor 1310 operates in the non PS-poll mode, the downlink frame including the downlink data pended for the STA may be transmitted to the STA without receiving the PS-poll frame. Further, when the STA operates in the PS-poll mode, in the case where the PS-poll frame is transmitted by the STA, the downlink frame including the downlink data pended for the STA may be transmitted to the STA.

The processor may transmit a non PS-poll mode parameter set element for receiving the frame based on the timer (the non PS-poll mode timer) to the STA. The non PS-poll mode parameter set element may include a non PS-poll mode timer field, a signal to noise ratio (SNR) threshold field, and a mobility threshold field.

The non PS-poll mode timer field may include information on an initial set value of the timer, the SNR threshold field may include information on a threshold of an SNR for a timer based frame receiving operation of the STA, and the mobility threshold field may include information on a mobility threshold for the timer based frame receiving operation of the STA.

The STA 1350 may include a processor 1360, a memory 1370, and a radio frequency (RF) unit 1380.

The RF unit 1380 is connected with the processor 1360 to transmit and/or receive the radio signal.

The processor 1360 implements a function, a process, and/or a method which are proposed in the present invention. For example, the processor 1320 may be implemented to perform the operation of the wireless apparatus according to the embodiment of the present invention. The processor may perform the operation of the wireless apparatus disclosed in the embodiment of FIGS. 1 to 12.

For example, the processor 1360 may switch an operating mode of the STA from a sleep mode to an active mode based on a listen interval in order to receive a first beacon frame transmitted by an access point (AP) after being switched to a power save mode and when the first beacon frame indicates data buffered for the STA, the processor 1360 may monitor the frame for the STA transmitted by the AP until the timer (non PS-poll mode timer) which starts at a switch point to the active mode expires and switch the operating mode of the STA to the sleep mode after the time expires. The timer may be reset when the frame is transmitted.

Further, the processor 1360 may switch the operating mode from the sleep mode to the active mode in order to receive a second beacon frame transmitted by the AP based on the listen interval and when the second beacon frame indicates the data buffered for the STA, the processor 1360 may transmit a power save (PS)-poll frame to the AP and monitor a polled frame based on the PS-poll frame transmitted from the AP, and when the end of the transmission of the polled frame is indicated, the processor 1360 may switch the operating mode to the sleep mode. The second beacon frame may be transmitted after the first beacon frame.

Further, the processor 1360 switch the operating mode from the sleep mode to the active mode in order to receive a third beacon frame transmitted by the AP based on the listen interval and when the third beacon frame indicates the data buffered for the STA, the processor 1360 may be implemented to monitor the frame for the STA transmitted from the AP until the timer which starts at the switch point to the active mode expires The third beacon frame may be transmitted after the second beacon frame.

The processors 1310 and 1360 may include an application-specific integrated circuit (ASIC), other chipset, a logic circuit, a data processing device, and/or a converter that converts a baseband signal and the radio signal to each other. The memories 1320 and 1370 may include a read-only memory (ROM), a random access memory (RAM), a flash memory, a memory card, a storage medium, and/or other storage devices. The RF units 1330 and 1380 may include one or more antennas that transmit and/or receive the radio signal.

When the embodiment is implemented by software, the aforementioned technique may be implemented by a module (process, function, and the like) performing the aforementioned function. The module may be stored in the memories 1320 and 1370 and executed by the processors 1310 and 1360. The memories 1320 and 1370 may be positioned inside or outside the processors 1310 and 1360 and connected with the processors 1310 and 1360 through various well-known means.

What is claimed is:

1. A method for operating based on a power save mode in a wireless local area network (WLAN) LAN, the method comprising:
    switching, by a station (STA), operating in the power save mode, from a sleep mode to an active mode at a first switching time based on a listen interval in order to receive a first beacon frame to be transmitted by an access point (AP),
    wherein a first timer of the STA starts at the first switching time;
    if a first traffic indication map (TIM) indicating a presence of a first downlink (DL) data frame buffered by the AP is received in the first beacon frame, monitoring, by the STA, the first DL data frame from the first switching time to an expiration time of the first timer without transmitting a power saving (PS) poll frame that polls the first DL data frame from the AP,
    wherein the first timer is set according to a non-PS poll mode parameter set element, and
    wherein the first downlink (DL) data frame is a frame based on a unicast scheme for the STA: and
    switching, by the STA, from the active mode to the sleep mode when the first timer expires,
    wherein the first timer is reset if the first DL data frame is received before the first timer expires,
    wherein the non-PS poll mode parameter set element includes a non-PS poll mode timer field, a signal to noise ratio (SNR) threshold field, and a mobility threshold field,
    wherein the non-PS poll mode timer field includes information on an initial set value of the first timer,
    wherein the SNR threshold field includes information on a threshold value of an SNR for receiving the first DL data frame based on the first timer, and
    wherein the mobility threshold field includes information on a threshold value of mobility for receiving the first DL data frame based on the first timer.

2. The method of claim 1, further comprising:
    switching, by the STA, the power save mode from the sleep mode to the active mode at a second switching time based on the listen interval in order to receive a second beacon frame to be transmitted by the AP,
    wherein the second beacon frame is received after the first beacon frame, and
    wherein a second timer of the STA starts at the second switching time;
    transmitting, by the STA, a PS poll frame to the AP when the second beacon frame indicates a presence of a second DL data frame buffered by the AP,
    wherein the second DL data frame is a frame based on a unicast scheme for the STA;
    monitoring, by the STA, the second DL data frame to be received from the AP in response to the PS poll frame; and
    switching, by the STA, the power save mode from the active mode to the sleep mode when an end of the transmission of the second DL data frame is indicated.

3. The method of claim 1, further comprising:
    receiving, by the STA, the non-PS poll mode parameter set element for receiving the first DL data frame based on the first timer from the AP.

4. The method of claim 1, wherein the initial set value is determined as a multiple of the listen interval.

5. A station (STA) for operating based on a power save mode in a wireless local area network (WLAN), the STA comprising:
    a radio frequency (RF) unit implemented to transmit or receive a radio signal; and a processor operatively connected with the RF unit, wherein the processor is implemented to;
    switch from a sleep mode to an active mode at a first switching time based on a listen interval in order to receive a first beacon frame to be transmitted by an access point (AP),
    wherein a first timer of the STA starts at the first switching time;
    if a first traffic indication map (TIM) indicating a presence of a first downlink (DL) data frame buffered by the AP is received in the first beacon frame, monitoring, by the STA, the first DL data frame from the first switching time to an expiration time of the first timer without transmitting a power saving (PS) poll frame that polls the first DL data frame from the AP,
    wherein the first timer is set according to a non-PS poll mode parameter set element, and
    wherein the first downlink (DL) data frame is a frame based on a unicast scheme for the STA: and
    switching, by the STA, from the active mode to the sleep mode when the first timer expires,
    wherein the first timer is reset if the first DL data frame is received before the first timer expires,
    wherein the non-PS poll mode parameter set element includes a non-PS poll mode timer field, a signal to noise ratio (SNR) threshold field, and a mobility threshold field,
    wherein the non-PS poll mode timer field includes information on an initial set value of the first timer,
    wherein the SNR threshold field includes information on a threshold value of an SNR for receiving the first DL data frame based on the first timer, and
    wherein the mobility threshold field includes information on a threshold value of mobility for receiving the first DL data frame based on the first timer.

6. The STA of claim 5, wherein:
    the processor is further implemented to:
        switch the power save mode from the sleep mode to the active mode at a second switching time based on the listen interval in order to receive a second beacon frame to be transmitted by the AP,
        transmit a PS-poll frame to the AP when the second beacon frame indicates a presence of a second DL data frame buffered by the AP, wherein the second DL data frame is a frame based on a unicast scheme for the STA, monitor the second DL data frame to be received from the AP in response to the PS poll frame, switch the power save mode from the active mode to the sleep mode when an end of the transmission of the second DL data frame is indicated, wherein the second beacon frame is received after the first beacon frame, and wherein a second timer of the STA starts at the second switching time.

7. The STA of claim 5, wherein the processor is further implemented to receive the non-PS poll mode parameter set element for receiving the first DL data frame based on the first timer from the AP.

8. The STA of claim 5, wherein the initial set value is determined as a multiple of the listen interval.

* * * * *